(12) United States Patent
Li et al.

(10) Patent No.: US 12,543,168 B2
(45) Date of Patent: Feb. 3, 2026

(54) FREQUENCY BAND ACTIVATING METHOD, APPARATUS, AND STORAGE MEDIUM

(71) Applicant: ZTE CORPORATION, Shenzhen (CN)

(72) Inventors: Nan Li, Shenzhen (CN); Zhiqiang Han, Shenzhen (CN); Ning Wei, Shenzhen (CN); Dan Yang, Shenzhen (CN); Bo Sun, Shenzhen (CN); Kaiying Lv, Shenzhen (CN); Jianfeng Lv, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/675,931

(22) Filed: May 28, 2024

(65) Prior Publication Data
US 2024/0314768 A1 Sep. 19, 2024

Related U.S. Application Data

(63) Continuation of application No. 17/284,352, filed as application No. PCT/CN2018/109653 on Oct. 10, 2018, now Pat. No. 12,028,848.

(51) Int. Cl.
*H04W 72/1263* (2023.01)
*H04W 8/00* (2009.01)
*H04W 72/0446* (2023.01)
*H04W 72/0453* (2023.01)

(52) U.S. Cl.
CPC ....... *H04W 72/1263* (2013.01); *H04W 8/005* (2013.01); *H04W 72/0446* (2013.01); *H04W 72/0453* (2013.01)

(58) Field of Classification Search
CPC ............ H04W 72/1263; H04W 8/005; H04W 72/0446; H04W 72/0453
See application file for complete search history.

(56) References Cited

U.S. PATENT DOCUMENTS

2011/0275374 A1* 11/2011 Narasimha ........ H04W 36/0005
455/436
2021/0360656 A1* 11/2021 Li ....................... H04W 74/006

\* cited by examiner

*Primary Examiner* — Duc C Ho
(74) *Attorney, Agent, or Firm* — Morgan, Lewis & Bockius LLP (57) ABSTRACT

Methods and devices are provided for facilitating wireless communication. In one exemplary aspect, a method for a terminal device is provided. The method includes receiving access resource information at a first frequency band, wherein the access resource information indicates an access resource available for accessing a network device in a second frequency band; and performing a network access operation using the access resource at the second frequency band.

20 Claims, 6 Drawing Sheets

//  FREQUENCY BAND ACTIVATING METHOD, APPARATUS, AND STORAGE MEDIUM

CROSS-REFERENCE TO RELATED APPLICATIONS

This is a continuation application of U.S. patent application Ser. No. 17/284,352, filed on Apr. 9, 2021, now U.S. Pat. No. 12,028,848, which is a National Stage Entry of International Patent Application No. PCT/CN2018/109653, filed on Oct. 10, 2018, the contents of which are incorporated herein by reference in their entireties.

TECHNICAL FIELD

The disclosure relates to the field of wireless communication technologies, and in particular, to a terminal device, a method for a terminal device, a network device and a method for a network device.

BACKGROUND

With the rapid development of wireless communication technologies, more and more wireless devices can operate in two or more frequency bands. Taking wireless local area networks (WLAN) as an example, many network devices can perform the communication in both of the 2.4 GHz and 5 GHz frequency bands.

In a wireless network, such as WLAN network, a wireless communication device may include an access point (AP) and a non-AP station (STA).

In a process of accessing the network, STA first performs network scanning to discover one or more available network devices. The STA performs scanning on multiple channels in certain band. The scanning process would be time consuming and result in a large energy consumption if total number of channels to be scanned is large. On the other hand, a number of devices working on a same band would cause collision on this band when STA performs scanning.

SUMMARY

This document relates to methods, systems, and devices for receiving access resource information.

In view of this, the disclosure provides the following solutions.

In one exemplary aspect, a method for a terminal device is provided according to an embodiment of the disclosure. The method includes: receiving access resource information in a first frequency band, wherein the access resource information indicates an access resource available for accessing a network device in a second frequency band; and performing a network access operation using the access resource in the second frequency band.

In another exemplary aspect, a method for a network device is provided according to an embodiment of the disclosure. The method includes: configuring an access resource available for accessing the network device in a second frequency band for a terminal device; and transmitting access resource information to the terminal device in a first frequency band, wherein the access resource information indicates the access resource.

In another exemplary aspect, a terminal device is provided according to an embodiment of the disclosure. The device includes a processor and a memory, wherein program codes are stored in the memory, and executes by the processor to implement the method according to the above first aspect.

In another exemplary aspect, a network device is provided according to an embodiment of the disclosure. The device comprises a processor and a memory, wherein program codes are stored in the memory, and executes by the processor to implement the method according to the above second aspect.

In another aspect, a non-volatile computer-readable medium is provided according to an embodiment of the disclosure, in which program codes are stored, wherein the program codes, when executed by a processor, implements the above method.

The above and other aspects and their implementations are described in greater detail in the drawings, the description and the claims.

DETAILED DESCRIPTION

In order to render the objects, technical solutions and advantages of the disclosure more clear, the embodiments of the disclosure will be described in detail below with reference to the accompanying drawings. It should be noted that the embodiments in the disclosure and the features in the embodiments may be arbitrarily combined with each other without conflict.

First Embodiment

Figure 1:
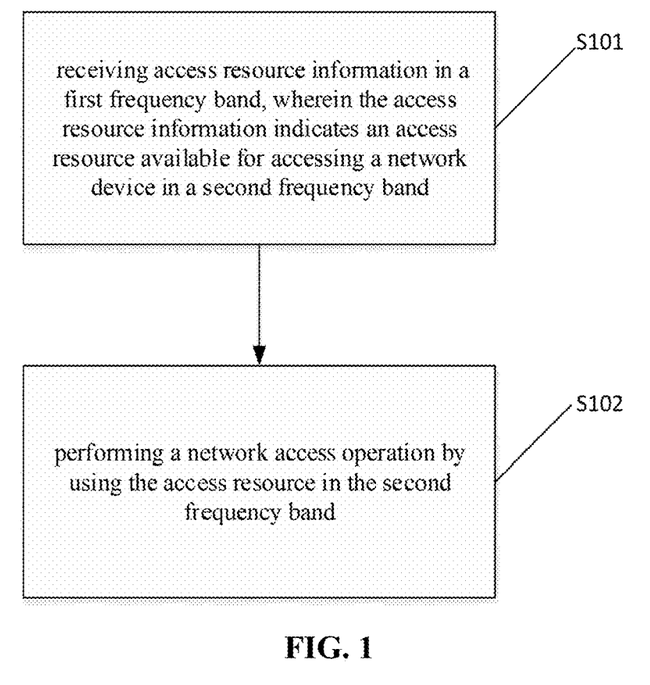
FIG. 1 is a flowchart of a method for a terminal device according to an embodiment of the disclosure.
Figure 2:
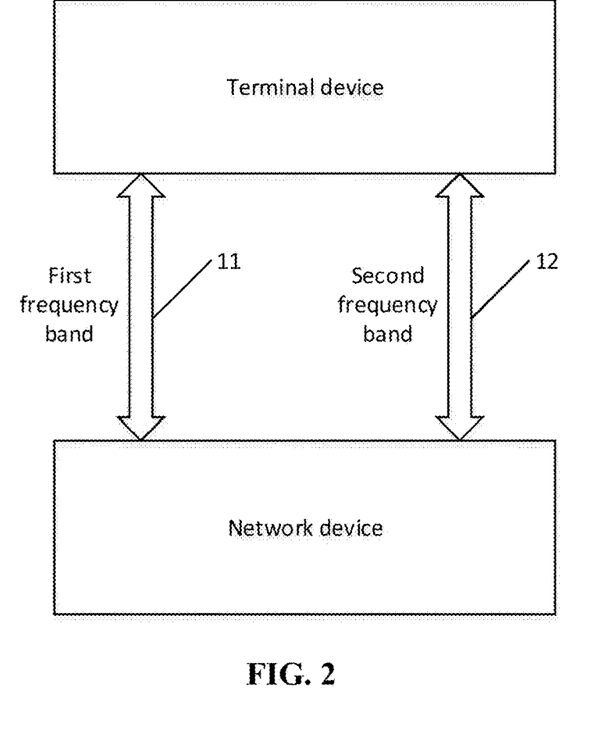
FIG. 2 is a schematic diagram of a terminal device in communication with a network device at multiple frequency bands according to an embodiment of the disclosure.

FIG. 1 is a flowchart of a method for a terminal device according to an embodiment of the disclosure. The method is applied to a terminal device. The terminal device includes, but not limited to, a user equipment (UE), a non-AP station (STA), and an in-vehicle terminal device. The terminal device may communicate with a network device on multiple frequency bands. For example, as shown in FIG. 2, the terminal device may communicate with the network device on both of a first frequency band 11 and a second frequency band 12.

The frequency band refers to a certain electromagnetic wave frequency range, which may include, for example, 1 GHz band, 2.4 GHz band, 5 GHz band, 6 GHz band, 45 GHz band, and 60 GHz band.

As shown in FIG. 1, the method may include S101-S102.

In S101, receiving access resource information in a first frequency band, wherein the access resource information indicates an access resource available for accessing a network device in a second frequency band.

The network device includes, but are not limited to, a base station (NodeB), a wireless access point (AP), a road side unit, a server, a cloud server, and an edge computation host. The network device may perform a wireless communication on multiple frequency bands. FIG. 2 is a schematic diagram of a terminal device in communication with a network device at multiple frequency bands according to an embodiment of the disclosure. For example, as shown in FIG. 2, the network device may perform a wireless communication with the terminal device on both of a first frequency band 11 and a second frequency band 12.

As shown in FIG. 2, the terminal device may receive the access resource information at the first frequency band 11. The access resource information indicates an access resource in the second frequency band, which is used to accessing the network device. In an embodiment of the disclosure, the first frequency band 11 is different from the second frequency band 12.

In S102, performing a network access operation by using the access resource in the second frequency band.

As shown in FIG. 2, the terminal device may perform a network access operation on the access resource of the second frequency band 12 based on the access resource information.

The access resource may include: a time-domain resource, a frequency-domain resource, or a time-frequency-domain resource.

Figure 3:
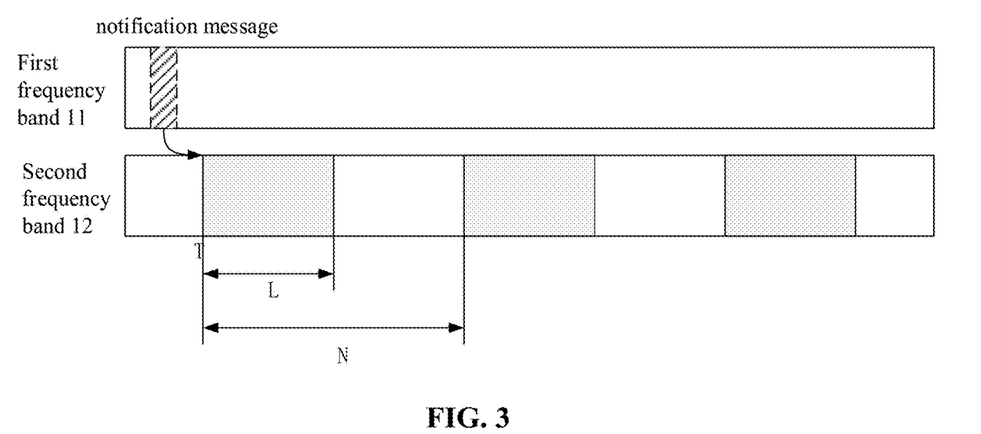
FIG. 3 is a schematic diagram of a time-domain resource according to an embodiment of the disclosure.

In an embodiment of the disclosure, the access resource includes a time-domain resource available for accessing the network device. For example, the access resource may include a start time available for accessing the network device, such as, a start time T on second frequency band 12 as shown in FIG. 3. The terminal device then performs a network access operation on the access resource of the second frequency band 12 at the beginning of the start time T.

In another embodiment, the access resource may include a series of duration of a time interval available for accessing the network device, and a start time of each time interval. For example, the time-domain resource may include available time intervals that are configured periodically or aperiodically on channels of the second frequency band 12. Then, the terminal device performs the network access operation from the start time T of the available time interval in the duration L of the available time interval.

FIG. 3 is a schematic diagram of a time-domain resource according to an embodiment of the disclosure. As shown in FIG. 3, the terminal device receives a notification message from the network device. The notification message carries the access resource information, which includes a start time T of the first available time interval and a duration L of the available time interval. In addition, when the available time interval is configured periodically, the access resource information may further include a periodicity N of the available time intervals. When the available time intervals are configured aperiodically, the start times of each available time intervals is configured by the network device and is informed to the terminal device.

The notification message may be sent to the terminal device on the first frequency band 11 or the second frequency band 12. The terminal device may perform the network access operation according to the received notification message.

In an embodiment of the disclosure, the access resource includes frequency-domain resources. For example, the frequency-domain resources may include one or more channels or sub-channels of the second frequency band available for accessing the network device.

Figure 4:
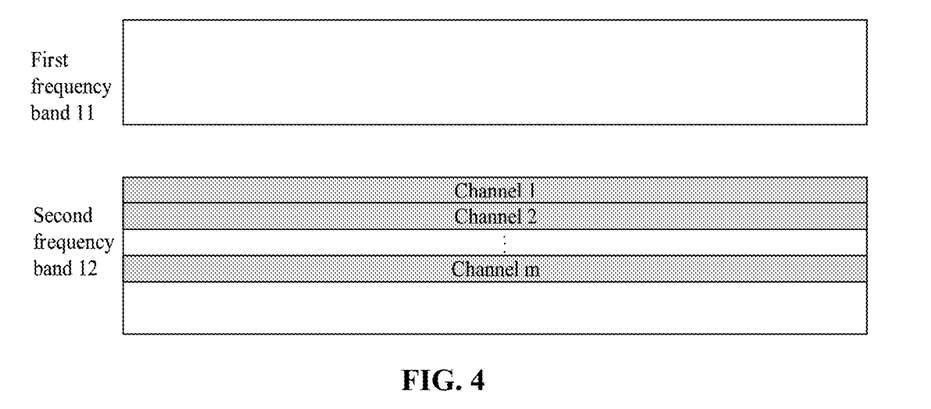
FIG. 4 is a schematic diagram of a frequency-domain resource according to an embodiment of the disclosure.
Figure 5:
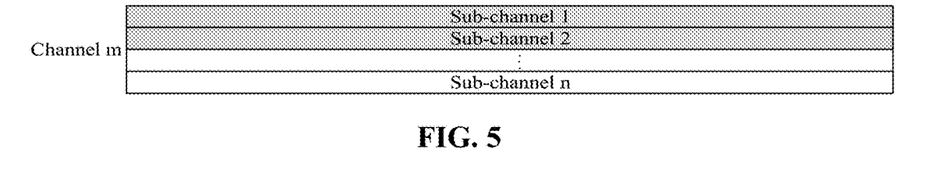
FIG. 5 is a schematic diagram of a frequency-domain resource according to another embodiment of the disclosure.

FIGS. 4 and 5 are schematic diagrams of a frequency-domain resource according to an embodiment of the disclosure. For example, as shown in FIG. 4, the second frequency band 12 includes m channels, i.e., channel 1, channel 2, . . . , and channel m, wherein m is an integer larger than or equals to 1. The access resource includes available channel(s) for accessing the network device, such as, channel 1 and channel 2. Then, the terminal device may access the network device on the channel 1 or channel 2.

Alternatively, as shown in FIG. 5, the channel m may include n sub-channels, i.e., sub-channel 1, sub-channel 2, . . . , sub-channel n, wherein n is an integer larger than or equals to 1. The sub-channel is a part of frequency resources in a specified channel. The access resource includes available sub-channel(s) for accessing the network device, such as, sub-channel 1. Then, the terminal device may access the network device on the sub-channel 1.

It is noted that in the case that the access resource includes multiple available channels or multiple available sub-channels, the terminal may attempt to perform the network access operation on available channels or available sub-channels in a specified order.

Figure 6:
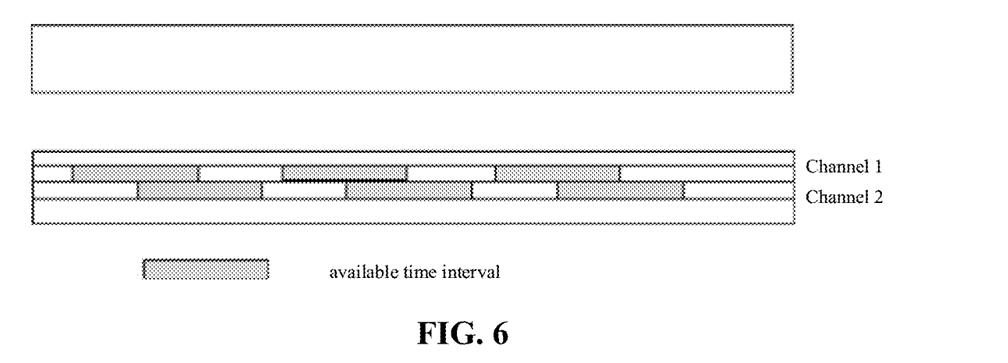
FIG. 6 is a schematic diagram of a time-frequency-domain resource according to an embodiment of the disclosure.

In an embodiment of the disclosure, the access resource includes time-frequency-domain resources. FIG. 6 is a schematic diagram of a time-frequency-domain resource according to an embodiment of the disclosure. In one embodiment, the time-frequency-domain resources may include available time interval(s) on channel(s) or sub-channel(s) available for accessing the network device, as shown in FIG. 6. In this case, the terminal device may perform the network access operation at the available time interval on a channel or sub-channel available for accessing the network device. In another embodiment, the time-frequency-domain resources may include a start time T on a specific channel. In this case, the terminal device may perform the network access operation at start time on the channel for accessing the network device.

In an embodiment of the disclosure, the method may further includes: determining a manner of scanning procedure in the network access operation. In addition, in S102, performing the network access operation using the access resource at the second frequency band in the manner of scanning procedure.

In an embodiment of the disclosure, the scanning procedure may include passive or active scanning, and is implemented, for example, in three manners. Active scanning includes, for example: sending a probe request frame to the network device, and receiving a probe response frame from the network device to acquire system information. Passive scanning includes, for example: receiving beacon frames from the network device to acquire system information. The system information includes various capability and operation parameters of the network device, such as Service Set Identifier (SSID), Basic Service Set (BSS) load, Quality of Service (QOS) capability, power capability, etc. The network access operation includes procedures of scanning, authentication and association.

In a first manner, the terminal device may perform an active scanning operation on the access resource indicated by the access resource information, to acquire system information from one or more network devices. Then, the terminal device proceeds the network access operation with a target network device using the access resource at the second frequency band, according to the system information.

In a second manner, the terminal device receives a system information message, such as, a short or compressed beacon frame, on the access resource indicated by the access resource information. The system information message includes all or a part of system information of a network device. Then, the terminal device performs a passive scanning operation with the network device using the access resource at the second frequency band to acquire all or the part of system information. This part of system information is used for network device selection.

Figure 7:
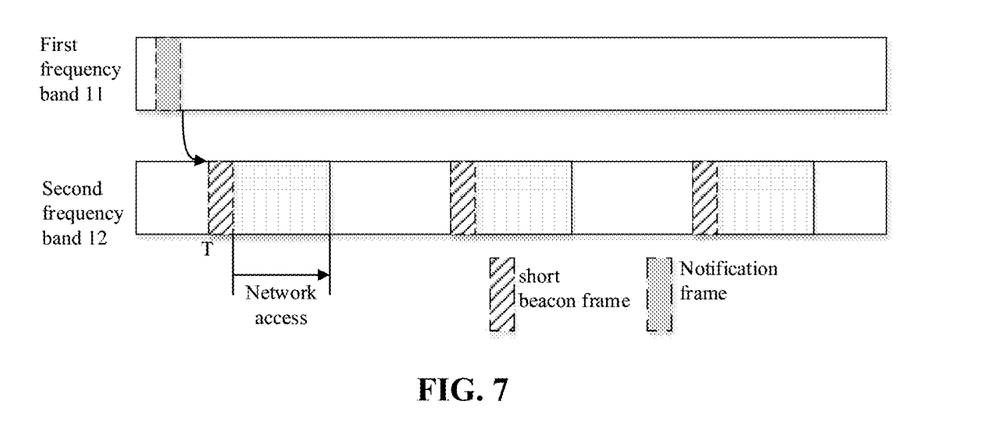
FIG. 7 is a schematic diagram of a network access operation according to an embodiment of the disclosure.

FIG. 7 is a schematic diagram of a network access operation according to an embodiment of the disclosure. As shown in FIG. 7, the terminal device receives a notification frame to notify the access resource, and receives a short beacon frame including a part of system information on the access resource. Then, the terminal device performs the network access operation using the access resource carried in the notification frame, according to the part of system information. In a process of accessing the network device, the terminal transmits an authentication request frame and an association request frame to the network device, so as to perform the network access operation.

In a third manner, the terminal device may receive a resource scheduling message on the access resource indicated by the access resource information. The resource scheduling message indicates resources for performing active scanning operation of a terminal device. The terminal device performs the active scanning operation on the resources indicated by the resource scheduling message, to acquire system information. Then, the terminal device performs the network access operation using the access resource at the second frequency band, according to the system information.

Figure 8:
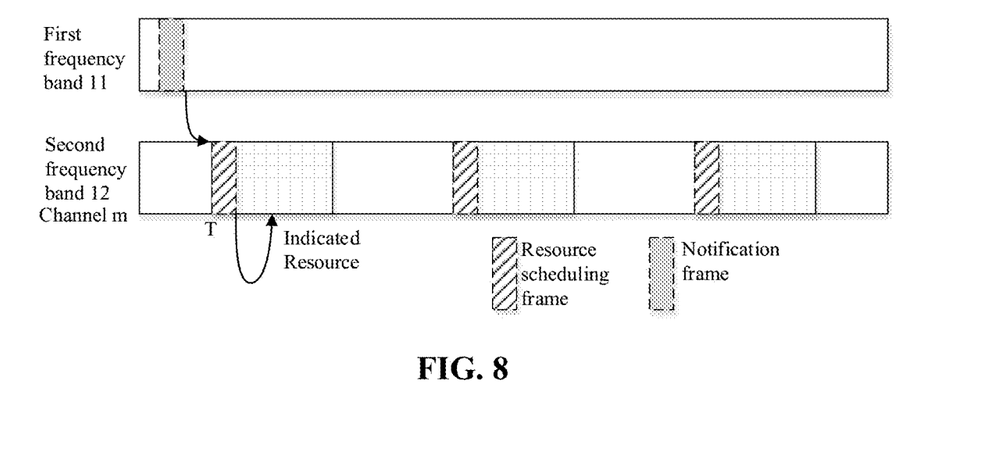
FIG. 8 is a schematic diagram of a network access operation according to an embodiment of the disclosure.

The manner of scanning procedure may be pre-defined. Alternatively, the manner of scanning procedure may be configured by the network device. Then, the network device transmits an access mode information to the terminal device, wherein the access mode information indicates the manner of scanning procedure in the network access operation. FIG. 8 is a schematic diagram of a network access operation according to an embodiment of the disclosure. As shown in FIG. 8, the terminal device receives a notification frame to notify the access resource, and receives a resource scheduling frame on the access resource. The resource scheduling frame indicates resources for performing active scanning operation of a terminal device. Then, the terminal device performs the active scanning operation on the resources indicated by the resource scheduling frame, to acquire system information, and performs the network access operation using the access resource at the second frequency band, according to the system information.

In another embodiment of the disclosure, the terminal device may further receive the access mode information from the network device at the first frequency band or the second frequency band. For example, the terminal device receives the access resource information and an access mode information at the first frequency band, to indicate that the terminal device may perform the network access operation with the second manner at a start time T on second frequency band, such as channel m. At the start time T, the terminal device starts passive scanning by receiving a short beacon on the second frequency band and then proceeds authentication and association procedures.

Second Embodiment

A method according to a second embodiment is similar as the method according to the first embodiment. The difference there between is that after performing the network access operation at the second frequency band, the method according to the second embodiment further includes:
  disabling the first frequency band;
  receiving an activation message at the second frequency band; and
  activating the first frequency band.

Figure 9:
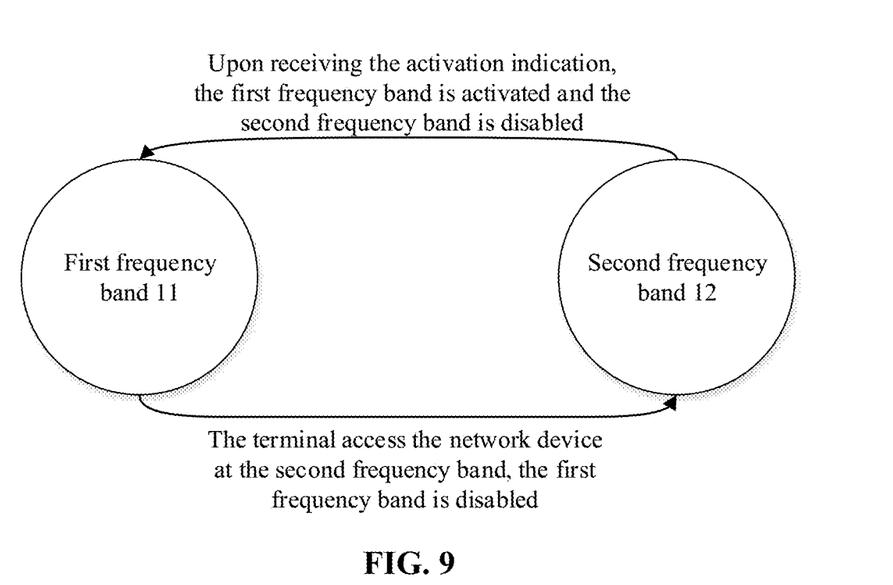
FIG. 9 is a schematic diagram of a process of activating and disabling a frequency band according to an embodiment of the disclosure.

In an embodiment, the terminal device performs communication on the first frequency band, and then accesses the network device on the second frequency band. FIG. 9 is a schematic diagram of a process of activating and disabling a frequency band according to an embodiment of the disclosure. In this case, as shown in FIG. 9, the terminal device disables the first frequency band. Disabling a first frequency band can be carried out via performing a suspend operation for the first frequency band. The suspend operation includes keeping a context of the first frequency band in a time period. The context includes, but not limited to, established traffic flow information, various types of counters and timers, key information, block acknowledgment protocol information, assigned addressing identities.

In the suspending of the first frequency band, the terminal device may receive an activation message to notify the terminal device of an activation of the first frequency band. The activation message may be a notification message for resuming the connection on the first frequency band, or indicate a buffer for the traffic flow on the first frequency band.

In an alternatively implementation, the method according to the second embodiment may include:
  disabling the first frequency band; and
  transmitting an activation indication at the first frequency band, to notify the network device of an activation of the first frequency band.

In the suspending of the first frequency band, the terminal device directly transmits a radio frame on the first frequency band to notify the network device of an activation of the first frequency band.

Third Embodiment

Figure 10:
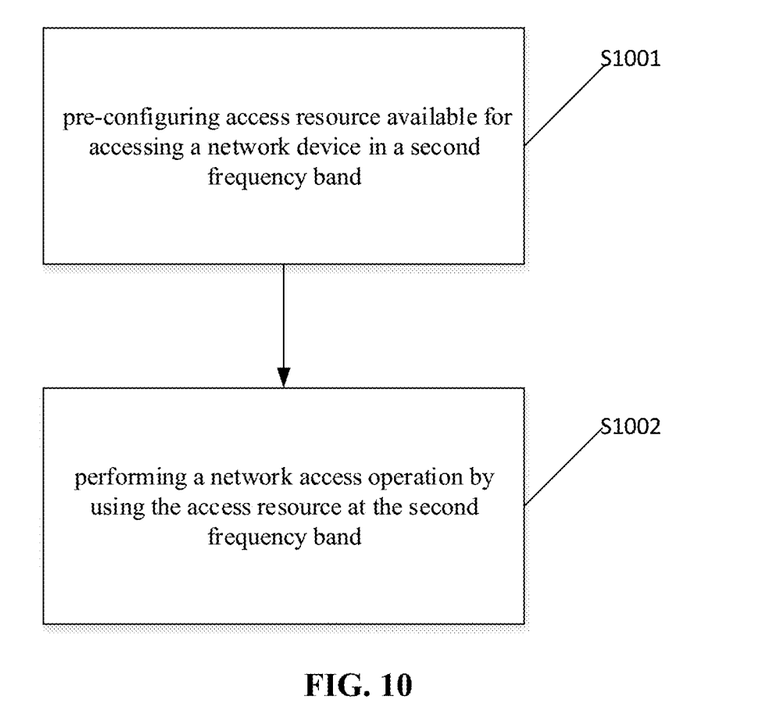
FIG. 10 is a flowchart of a method for a terminal device according to an embodiment of the disclosure.

FIG. 10 is a flowchart of a method for a terminal device according to an embodiment of the disclosure. The method is applied to a terminal device. The method according to FIG. 10 includes S1001 and S1002.

In S1001, pre-configuring access resource available for accessing a network device in a second frequency band.

In S1002, performing a network access operation by using the access resource at the second frequency band.

In an embodiment, the first frequency band is different from the second frequency band. The access resource may include a time-domain resource, a frequency-domain resource, or a time-frequency-domain resource.

Figure 11:
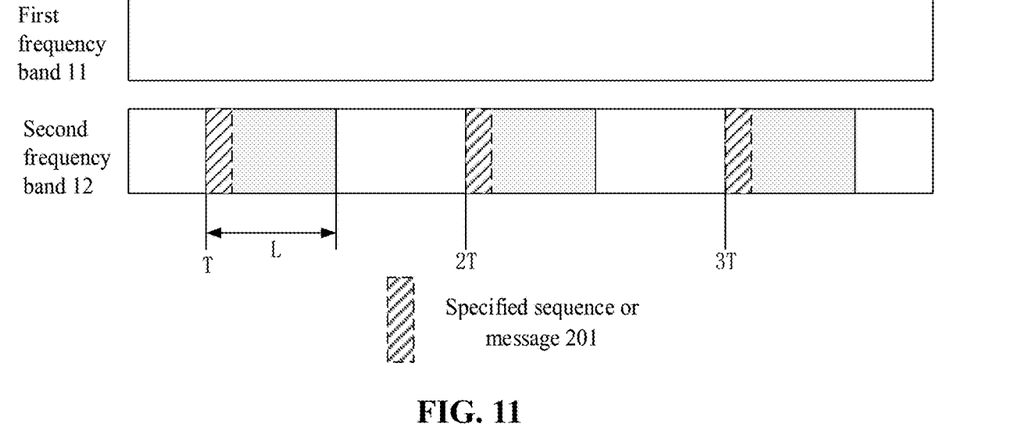
FIG. 11 is a schematic diagram of a pre-configured time-domain resource according to an embodiment of the disclosure.

The pre-configured time-domain resource includes a duration of a time interval available for accessing the network device, and a start time of the time interval. FIG. 11 is a schematic diagram of a pre-configured time-domain resource according to an embodiment of the disclosure. As shown in FIG. 11, the terminal device determines a duration L of a time interval available for accessing the network device, and a start time T of the time interval the pre-configured time-domain resource.

In an implementation, the terminal device may pre-configure the start time T of the time interval and a multiple M of the start time T, where M is an integer larger than or equal to 1. The terminal device performs the network access operation on the second frequency band during the duration L from the time MT.

The start time T may be determined by an external clock source, such as coordinated universal time. Alternatively, the terminal estimates the time MT by the external clock source, and receives a preset sequence from the network device on the second frequency band to accurately determine the time MT. Alternatively, the terminal estimates the time MT by the external clock source, and receive a specified type of wireless frame the network device on the second frequency band to accurately determine the time MT, as shown in FIG. 11.

In an embodiment of the disclosure, the access resource includes pre-configured frequency-domain resources. For example, the frequency-domain resources may include one or more channels or sub-channels of the second frequency band available for accessing the network device.

In an embodiment of the disclosure, the access resource includes pre-configured time-frequency-domain resources. For example, the time-frequency-domain resources may include multiple available time intervals on one or more channels or sub-channels available for accessing the network device.

Fourth Embodiment

Figure 12:
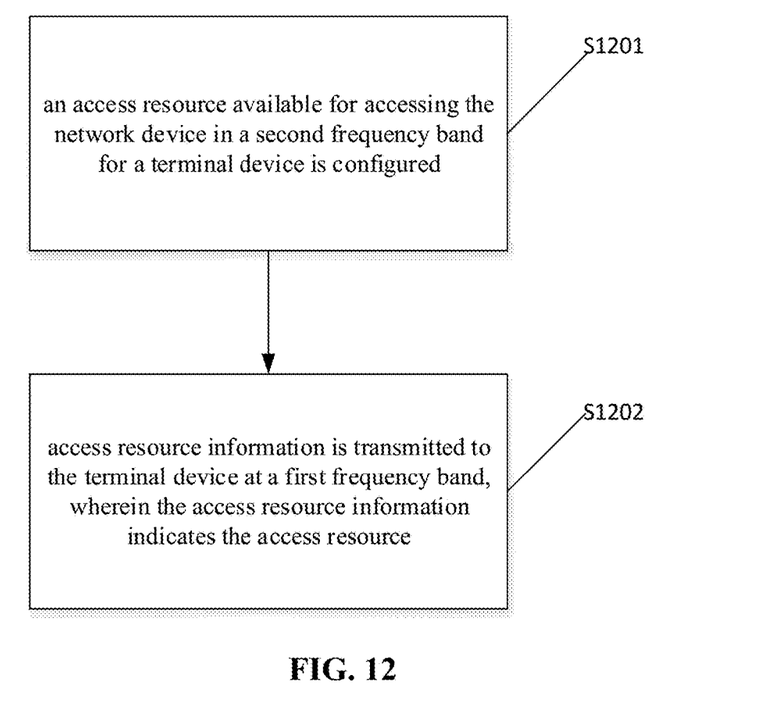
FIG. 12 is a flowchart of a method for a network device according to an embodiment of the disclosure.

FIG. 12 is a flowchart of a method for a network device according to an embodiment of the disclosure. The method is applied to a network device. The method includes S1201 and S1202.

In S1201, configuring an access resource available for accessing the network device in a second frequency band for a terminal device.

The access resource may include: a time-domain resource, a frequency-domain resource, or a time-frequency-domain resource.

In an embodiment of the disclosure, the access resource includes a time-domain resource available for accessing the network device. For example, the access resource may include a start time available for accessing the network device, such as, a start time T on second frequency band 12 as shown in FIG. 3. The network access operation may be performed on the access resource of the second frequency band 12 at the beginning of the start time T.

In another embodiment, the access resource may include a series of duration of a time interval available for accessing the network device, and a start time of each time interval. For example, the time-domain resource may include available time intervals that are configured periodically or aperiodically on channels of the second frequency band 12. Then, the network access operation may be performed from the start time T of the available time interval in the duration L of the available time interval.

As shown in FIG. 3, the network device may configure a start time T of the available time interval and a duration L of the available time interval. In addition, when the available time interval is configured periodically, the network device may further configure a periodicity N of the available time interval.

In an embodiment of the disclosure, the access resource includes frequency-domain resources. For example, the frequency-domain resources may include a channel or sub-channel of the second frequency band available for accessing the network device.

For example, as shown in FIG. 4, the second frequency band 12 includes m channels, i.e., channel 1, channel 2, ..., and channel m, wherein m is an integer larger than 1. The network device may configure an available channel for accessing the network device, such as, channel m.

Alternatively, as shown in FIG. 5, the channel m may include n sub-channels, i.e., sub-channel 1, sub-channel 2, ..., sub-channel n, wherein n is an integer larger than 1. The network device may configure an available sub-channel for accessing the network device, such as, sub-channel 1.

In an embodiment of the disclosure, the access resource includes time-frequency-domain resources. In one embodiment, the time-frequency-domain resources may include available time interval(s) on channel(s) or sub-channel(s) available for accessing the network device, as shown in FIG. 6. In this case, the network access operation may be performed at the available time interval on a channel or sub-channel available for accessing the network device. In another embodiment, the time-frequency-domain resources may include a start time T on a specific channel. In this case, the network access operation may be performed at start time on the channel for accessing the network device.

In S1202, transmitting access resource information to the terminal device at a first frequency band, wherein the access resource information indicates the access resource.

In an embodiment of the disclosure, the first frequency band 11 is different from the second frequency band 12.

In an embodiment of the disclosure, the method may further includes: configuring an access mode information, wherein the access mode information indicates a manner of scanning procedure in the network access operation; and transmitting the access mode information to the terminal device. The scanning procedure, for example, may include passive or active scanning. Active scanning includes: for example, receiving a probe request frame from the terminal device, and sending a probe response frame to the terminal device to notify system information. Passive scanning includes: for example, sending beacon frames to the terminal device to notify system information. The system information includes various capability and operation parameters of the network device, such as Service Set Identifier (SSID), Basic Service Set (BSS) load, Quality of Service (QOS) capability, power capability, etc. The network access operation includes, for example, procedures of scanning, authentication and association.

In another embodiment of the disclosure, the network device may further transmit the access mode information to the terminal device at the first frequency band or the second frequency band. For example, the network device transmits the access resource information and an access mode information to the terminal device at the first frequency band, to indicate that the terminal device may perform the network access operation with the second manner at a start time T on second frequency band, such as channel m. At the start time T, the terminal device starts passive scanning by receiving a short beacon on the second frequency band and then proceeds authentication and association procedures.

In an embodiment of the disclosure, the network device transmits a system information message, such as, a short or compressed beacon frame, to the terminal device on the access resource. The system information message may include all or a part of system information. The terminal device perform the network access operation based on the all or the part of system information. This part of system information is used for network device selection.

Alternatively, the network device transmits a resource scheduling message to the terminal device on the access resource, to notify the terminal device of an active scanning operation on a specified resource. The terminal device performs the active scanning operation on the specified resources indicated by the resource scheduling message, to acquire system information. Then, the terminal device performs the network access operation using the access resource at the second frequency band, according to the system information.

Figure 13:
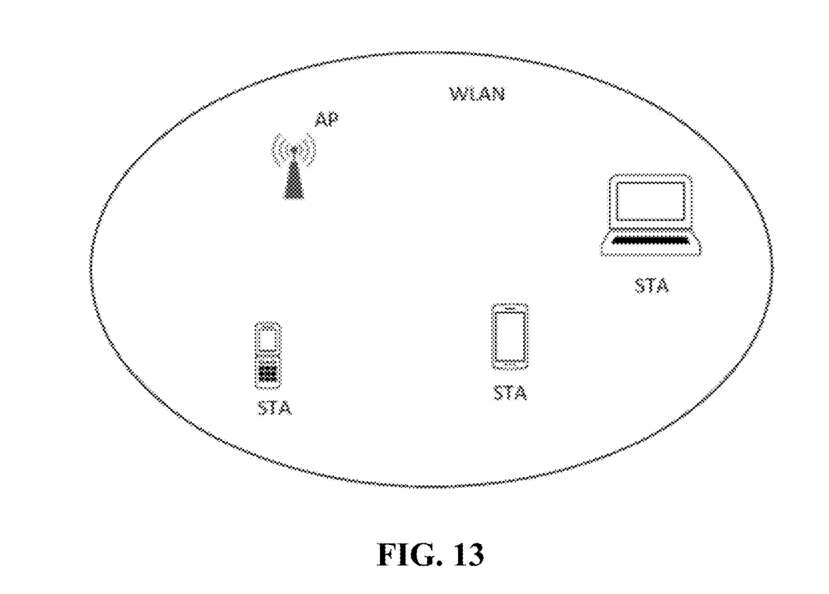
FIG. 13 is an example of a wireless communication system where techniques in accordance with one or more embodiments of the present technology can be applied.

FIG. 13 shows an example of a wireless communication system where techniques in accordance with one or more embodiments of the present technology can be applied. As illustrated in FIG. 13, there is illustrated a WLAN network. The WLAN network as illustrated in FIG. 13 includes an AP and multiple STAs associated with the AP. The STA is used as a terminal device, which is configured to implement the method according to the above first, second and third embodiments. The AP is used as a network device, which is configured to implement the method according to the above fourth embodiment. It should be noted that the diagram of the wireless network here is merely illustrative but not limiting.

Figure 14:
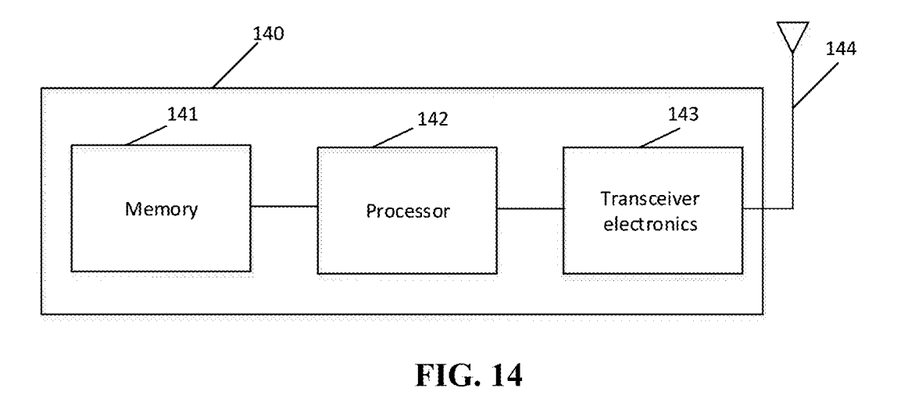
FIG. 14 is a block diagram representation of a portion of a terminal device.

FIG. 14 is a block diagram representation of a terminal device. The terminal device 140 such as a base station or a wireless device (or UE) can include a memory 141 and a processor 142 such as a microprocessor. The program instructions are stored in the memory, which are executed to implement one or more of the method presented in the above embodiments of this document. The terminal device 140 can include transceiver electronics 143 to send and/or receive wireless signals over one or more communication interfaces such as antenna 144. The terminal device 140 can include other communication interfaces for transmitting and receiving data. In some implementations, the processor 142 can include at least a portion of the transceiver electronics 143. In some embodiments, at least some of the disclosed techniques, modules or functions are implemented using the terminal device 140.

Figure 15:
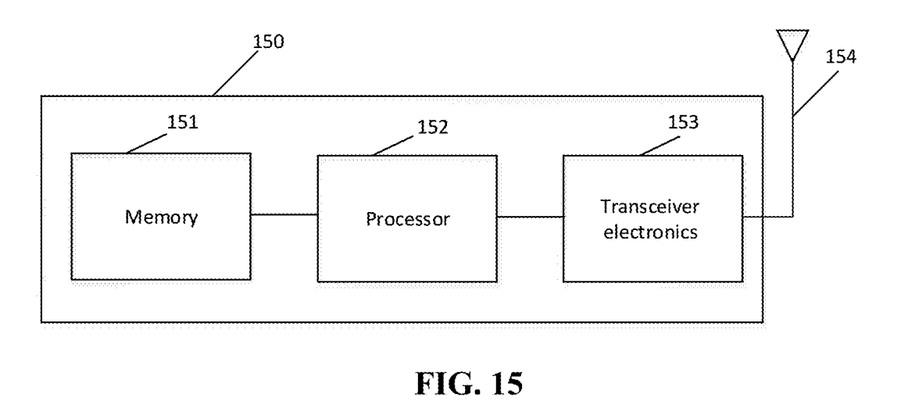
FIG. 15 is a block diagram representation of a portion of a network device.

FIG. 15 is a block diagram representation of a network device. The network device 150 such as an Access Point (AP) can include a memory 151 and a processor 152 such as a microprocessor. The program instructions are stored in the memory, which are executed to implement one or more of the method presented in the above embodiments of this document. The network device 150 can include transceiver electronics 153 to send and/or receive wireless signals over one or more communication interfaces such as antenna 154. The terminal device 150 can include other communication interfaces for transmitting and receiving data. In some implementations, the processor 152 can include at least a portion of the transceiver electronics 153. In some embodiments, at least some of the disclosed techniques, modules or functions are implemented using the terminal device 150.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc., that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A frequency band activating method, applied by a terminal device, comprising:
   receiving an activation message at a second frequency band; and
   activating a first frequency band according to the activation message;
   or,
   transmitting an activation indication at a first frequency band, to notify a network device of an activation of the first frequency band.

2. The frequency band activating method according to claim 1, wherein the first frequency band is different from the second frequency band.

3. The frequency band activating method according to claim 1, wherein before receiving the activation message at the second frequency band, or transmitting the activation indication at the first frequency band,
   the frequency band activating method further comprises:
   disabling the first frequency band.

4. The frequency band activating method according to claim 3, wherein disabling the first frequency band comprises:
   performing suspend operation on the first frequency band,
   wherein the suspend operation comprises keeping a context of the first frequency band in a time period, and the context of the first frequency band comprises established traffic flow information, counters and timers, key information, block acknowledgment protocol information, and assigned addressing identities.

5. The frequency band activating method according to claim 4, wherein receiving the activation message at a second frequency band comprises:
   after the first frequency band is suspended, receiving the activation message.

6. The method according to claim 5, wherein activating the first frequency band according to the activation message comprises:
   resuming connection on the first frequency band according to the activation message, or
   determining a buffer for a traffic flow on the first frequency band according to the activation message.

7. The frequency band activating method according to claim 4, wherein transmitting the activation indication at the first frequency band comprises:
   after the first frequency band is suspended, transmitting a radio frame at the first frequency band to notify the network device of the activation of the first frequency band, wherein the activation indication is carried in the radio frame.

8. The frequency band activating method according to claim 1, further comprising:
   establishing communication with the network device at the first frequency band and the second frequency band.

9. A frequency band activating device, comprising:
   a memory storing an executable program; and
   a processor,
   wherein when the processor calls the executable program, the processor is configured to:
   receive an activation message at a second frequency band; and
   activate a first frequency band according to the activation message;
   or, wherein when the processor calls the executable program, the processor is configured to:
   transmit an activation indication at a first frequency band, to notify a network device of an activation of the first frequency band.

10. The frequency band activating device according to claim 9, wherein the first frequency band is different from the second frequency band.

11. The frequency band activating device according to claim 9, wherein
    when the processor calls the executable program, the processor is configured to:
    disable the first frequency band before the activation message is received at the second frequency band or the activation indication is transmitted at the first frequency band.

12. The frequency band activating device according to claim 11, wherein when the processor calls the executable program, the processor is configured to:
    perform suspend operation on the first frequency band,
    wherein the suspend operation comprises keeping a context of the first frequency band in a time period, and the context of the first frequency band comprises established traffic flow information, counters and timers, key information, block acknowledgment protocol information, and assigned addressing identities.

13. The frequency band activating device according to claim 12, wherein when the processor calls the executable program, the processor is configured to:
    after the first frequency band is suspended, receive the activation message.

14. The frequency band activating device according to claim 13, wherein when the processor calls the executable program, the processor is further configured to:
    resume connection on the first frequency band according to the activation message, or determine a buffer for a traffic flow on the first frequency band according to the activation message.

15. The frequency band activating device according to claim 12, wherein when the processor calls the executable program, the processor is configured to:
    after the first frequency band is suspended, transmit a radio frame at the first frequency band to notify the network device of the activation of the first frequency band, wherein the activation indication is carried in the radio frame.

16. The frequency band activating device according to claim 9, wherein when the processor calls the executable program, the processor is configured to:
    establish communication with the network device at the first frequency band and the second frequency band.

17. A non-transitory computer-readable storage medium in which program codes are stored, wherein the program codes, when executed by a processor, implements:
    receiving an activation message at a second frequency band; and
    activating a first frequency band according to the activation message;
    or, wherein the program codes, when executed by a processor, implements:
    transmitting an activation indication at a first frequency band, to notify a network device of an activation of the first frequency band.

18. The non-transitory computer-readable storage medium according to claim 17, wherein the first frequency band is different from the second frequency band.

19. The non-transitory computer-readable storage medium according to claim 17, wherein the program codes, when executed by a processor, implements:
 disabling the first frequency band before the activation message is received at the second frequency band or the activation indication is transmitted at the first frequency band.

20. The non-transitory computer-readable storage medium according to claim 17, wherein the program codes, when executed by a processor, implements:
 establishing communication with the network device at the first frequency band and the second frequency band.

* * * * *